US012053672B2

(12) United States Patent
Coelho Alves et al.

(10) Patent No.: US 12,053,672 B2
(45) Date of Patent: Aug. 6, 2024

(54) SENSING OF STRETCHING OF STRAPS OF MOTION TRACKING SYSTEM FOR ENHANCED USAGE OF THE SYSTEM

(71) Applicant: SWORD Health S.A., Oporto (PT)

(72) Inventors: José Carlos Coelho Alves, Oporto (PT); João Paulo Dias Andrade, Oporto (PT); Márcio Filipe Moutinho Colunas, Oporto (PT); Pedro Miguel Moreira De Sousa, Oporto (PT); Pedro Miguel Simões Bastos Martins, Oporto (PT); Pedro Filipe Xavier Rodrigues, Oporto (PT); Ivo Emanuel Marques Gabriel, Oporto (PT); Virgílio António Ferro Bento, Oporto (PT)

(73) Assignee: SWORD HEALTH, S.A., Oporto (PT)

( * ) Notice: Subject to any disclaimer, the term of this patent is extended or adjusted under 35 U.S.C. 154(b) by 310 days.

(21) Appl. No.: 17/551,830

(22) Filed: Dec. 15, 2021

(65) Prior Publication Data
US 2023/0166155 A1  Jun. 1, 2023

(30) Foreign Application Priority Data
Nov. 29, 2021  (EP) .................................... 21398024

(51) Int. Cl.
  *A63B 24/00*  (2006.01)
  *A63B 71/06*  (2006.01)
  *G01L 5/10*  (2020.01)
  *G01P 13/00*  (2006.01)
  (Continued)

(52) U.S. Cl.
CPC ............ *A63B 24/0062* (2013.01); *G01L 5/10* (2013.01); *G01P 13/00* (2013.01); *G06F 3/011* (2013.01);
(Continued)

(58) Field of Classification Search
CPC ........ A63B 24/0062; A63B 2024/0068; A63B 2071/0652; A63B 2220/40;
(Continued)

(56) References Cited

U.S. PATENT DOCUMENTS 10,758,160 B2 *  9/2020  Gong ................... A61B 5/6831
11,774,246 B2 * 10/2023  Santos ................. A61B 5/1126
                                                             73/865.4
(Continued)

FOREIGN PATENT DOCUMENTS

WO       2019243438 A1    12/2019
WO    WO-2022207485 A1    10/2022

OTHER PUBLICATIONS

EP Application No. 22398029.3 Extended European Search Report dated May 4, 2023.

*Primary Examiner* — Andrew S Lo
(74) *Attorney, Agent, or Firm* — SCHWEGMAN LUNDBERG & WOESSNER, P.A.

(57) ABSTRACT

A method includes the following steps: processing, by a computing device, at least a stretch value per strap of straps of a motion tracking system; comparing, by the computing device, the stretch value of each strap or a length value derived therefrom with a stored baseline value of the respective strap, the stored value being associated with the same person, and the length value being representative of a length of a respective strap at least based on the respective stretch value. The method further includes executing, by the computing device, a corrective action at least when one of the comparisons made exceeds a predetermined threshold. Also, a motion tracking system, a data processing device, a computer program, and a computer-readable medium are related.

20 Claims, 4 Drawing Sheets

(51) Int. Cl.
*G06F 3/01* (2006.01)
*G06T 7/70* (2017.01)

(52) U.S. Cl.
CPC ........ *G06T 7/70* (2017.01); *A63B 2024/0068* (2013.01); *A63B 2071/0652* (2013.01); *A63B 2220/40* (2013.01); *A63B 2220/803* (2013.01); *A63B 2220/836* (2013.01); *G06T 2207/30196* (2013.01)

(58) Field of Classification Search
CPC ........ A63B 2220/803; A63B 2220/836; G01L 5/10; G01L 5/102; G01P 13/00; G06F 3/011; G06F 3/017; G06T 7/70; G06T 2207/30196; G06T 7/246; A61B 5/0077; A61B 5/06; A61B 5/1126; A61B 5/6823; A61B 5/6828; A61B 5/6831; A61B 5/6843; A61B 2505/09
See application file for complete search history.

(56) References Cited

U.S. PATENT DOCUMENTS

| | | | |
|---|---|---|---|
| 2002/0170193 A1* | 11/2002 | Townsend | A61B 5/1116 |
| | | | 33/512 |
| 2016/0157779 A1* | 6/2016 | Baxi | A61B 5/02055 |
| | | | 600/595 |
| 2017/0036066 A1* | 2/2017 | Chahine | A41D 1/002 |
| 2018/0256074 A1* | 9/2018 | Persidsky | A61B 5/113 |
| 2018/0271409 A1* | 9/2018 | Gong | A61B 5/1118 |
| 2019/0086205 A1* | 3/2019 | Franks | A61B 5/681 |
| 2019/0168071 A1* | 6/2019 | Franks | A61B 5/1072 |
| 2020/0029882 A1* | 1/2020 | Gong | A61B 5/1118 |
| 2020/0281508 A1* | 9/2020 | Ren | A61B 5/4519 |
| 2020/0352476 A1* | 11/2020 | Ladd | G06F 3/14 |
| 2022/0000424 A1* | 1/2022 | Nebuya | D02G 3/04 |
| 2022/0122728 A1* | 4/2022 | Wahl | A61B 5/7282 |

* cited by examiner

SENSING OF STRETCHING OF STRAPS OF MOTION TRACKING SYSTEM FOR ENHANCED USAGE OF THE SYSTEM

CROSS-REFERENCE TO RELATED APPLICATIONS

This application is related to and claims the benefit of European Patent Application No. 21398024, filed on Nov. 29, 2021, the contents of which are herein incorporated by reference in their entirety.

TECHNICAL FIELD

The present disclosure relates to the technical field of motion tracking systems. More particularly, it relates to devices, systems and procedures for sensing the stretching of straps where motion trackers are arranged and establishing, at least based on the sensed values, whether a motion tracking system is correctly used and/or the condition of the user of the motion tracking system.

BACKGROUND

Many motion tracking systems have motion trackers, also referred to herein as trackers or inertial measurement units (IMUs), that are arranged on the target whose motion is to be tracked. The trackers include inertial sensors that measure e.g. orientations, angular velocities, accelerations, forces, etc., which may then be used to derive the motion of the tracked target.

While using a system with IMUs to track movement of a target, e.g. people, body parts thereof, objects, etc. it is important to attach the IMUs to the target correctly and ensure that they are correctly attached. Therefore, holding devices for trackers such as straps or devices for pinning the trackers into the target, like e.g. clothes of a person, are essential to make sure that the trackers are placed tight to the target to avoid that the tracker may fall off during the period of time that the target is tracked. If not, the motion of that specific part of the target can be incorrectly processed due to unexpected movements of the device keeping the tracker in place and, consequently, of the tracker.

In the case of straps, although the tracker is arranged tightly on the target, the strap and tracker can move during some movements, and in the case of person tracking that might be due to soft tissues and/or the use of loose-fitting clothes. It is important that this movement is tracked in order to advise the user to re-adjust the position of the tracker or even to take it into account when measuring the movement of the body member. Another problem of straps is that, if they are, for instance, elastic, they start getting loose with usage; that becomes another source of error for misdetections. In this case, the detection of this problem is essential to perform a replacement or some adjustments to the loose straps.

Besides the tight placement on the target, in order to provide an accurate motion tracking sequence, it is essential to ensure that the trackers are placed on the most suitable place, which means that the straps holding them on the target must be on the most suitable place. The problem of inaccurate positioning of trackers is exacerbated when analogous parts of the target are to be tracked, for instance, the two legs or arms of a person; in that case, the uneven positioning of the straps and, thus, the trackers on the two parts worsens the motion tracking sequence provided.

When a person is debilitated in some member due to immobilization of it, which can occur e.g. after a chirurgical process, the person loses some muscular mass. The loss of muscular mass can influence the volume and circumference (i.e. perimeter) of the member and, consequently, the positioning of the straps on it; the circumference is preferably of a cross-section taken along the segment extending between respective joints of the body member so that it is perpendicular to the segment. It is important to take into account this condition of the person at one or several moments during a rehabilitation process, including but not limited to e.g. the first initial session(s) of a rehabilitation process.

In summary, when straps are used in a motion tracking system, their placement and their condition are important to get correct measurements, hence an accurate motion tracking sequence and, when the target is a person, accurate guidance of the person. This is even more important when the motion tracking sessions are meant to help a person to recover from an injury, for instance by way of a procedure like that described in international application publication number WO2019243438A1, in which motion trackers can be used to supervise the performance of movements by a person during a physical rehabilitation process.

There is an interest in solving one or more of the aforesaid problems, especially while the motion tracking process is underway and the target is in movement.

SUMMARY

A first aspect of the disclosure relates to a method including:
  processing, by a computing device, at least a stretch value per strap of a plurality of straps of a motion tracking system, each stretch value being representative of stretching of the respective strap;
  comparing, by the computing device, the stretch value of each strap of the plurality of straps or a length value derived therefrom with a stored baseline value of the respective strap, the stored value being associated with the same person, and the length value being representative of a length of a respective strap of the plurality of straps at least based on the respective stretch value; and
  executing, by the computing device, a corrective action at least when one of the comparisons made exceeds a predetermined threshold.

Each strap either includes or is adapted to receive a unit of a plurality of inertial measurement units of the motion tracking system; in the latter case, the units are removably attachable to the straps. The straps thus keep the units arranged on the body of the person for tracking motion thereof or at least of several body members of the person.

The method enables the adjustment of the motion tracking system and/or inference of information about the straps and/or about the target, particularly a person, relying on the stretching of the straps.

Whenever the straps are arranged on the body members of the person, which means that the stretch values are representative of the stretching of the respective strap while the straps are arranged on a respective body member of the person that is a predetermined body member of a predetermined strap arrangement, the straps are stretched more or less depending on the circumference (that is to say, perimeter) of the body member, and the position of the strap on the body member. The material that the strap is made of also determines how much it stretches, but that is inherent to each strap and the variation in stretching thus depends on the aforesaid parameters: the body member on which they are arranged and how are they arranged thereon.

And whenever the straps are not arranged on the body members of the person, which means that the stretch values are representative of the stretching of the respective strap, the change in stretching over time indicates the wearing off of the straps. Too worn off straps will not stay on the body members of the person in place, especially while the person exercises.

The motion tracking system senses how stretched each strap is thereby providing the stretch values that are processed by the computing device to make the comparisons. To this end, the system includes at least as many stretching sensors as straps are, namely, sensors configured to measure stretching. Each stretching sensor can be arranged on the strap itself, and so the sensor is capable of measuring the stretching of the strap both while no unit is included or attached to the strap, and while the unit is included or attached to the strap. Alternatively, each stretching sensor can be arranged such that one portion thereof is on the strap and another portion thereof is on the unit; in this case, the two portions of the stretching sensor cooperate to make the stretch measurement possible. Terminals or electrodes can be arranged in one or the two portions so that an electrical current or potential is applied to the strap and measured by electronics of the stretching sensor arranged on one portion or the other.

The stretch value can be measured as different magnitudes, for example, resistance, capacitance, voltage, etc. By way of example, the stretching sensors include an electrical conductor with e.g. a resistance sensor, or a capacitor sensor, or a piezoelectric sensor.

The computing device determines characteristics about the strap or the person itself by comparing the stretch value of each strap (or the length value of each strap in embodiments in which the computing device computes it) with the stored baseline value for the same person. That is to say, the computing device makes the comparison for values associated with the same user, and the comparison is particularly between the stretch (or length) value of each strap with a baseline value of each strap, the latter being stored beforehand. This comparison is indicative of one or more of: possible misplacements of a strap, changes in muscular mass in the body member of the person, where the strap is arranged on the body of the person, etc.

As will be explained later on, the baseline values might be established during the first motion tracking session of each person that will be a user of the motion tracking system; in this case, when the person is to start using the motion tracking system for the very first time, the stretch values of the straps or length values derived therefrom by the computing device are registered as baseline values and are stored for ulterior comparisons. Additionally or alternatively, the baseline values might be established throughout several motion tracking sessions of each person, preferably consecutive motion tracking sessions and preferably including the first motion tracking sessions; in this case, the stretch or length values are averaged each time a new motion tracking session takes place and said motion tracking session is to be used for setting the baseline values, hence after a number of motion tracking sessions configurable in the computing device, e.g. three sessions, five sessions, ten sessions, etc., the values, be it stretch or length values, are not used for establishing the baseline values for each strap, thereby relying on the initial motion tracking sessions for setting said baseline values. Notwithstanding, in some cases, the baseline values are established in the motion tracking session when the motion of the person is to be tracked, namely the baseline values are derived during the same session and within a short time span from the actual motion tracking, e.g. ten minutes, half an hour, one hour, two hours, etc.

A number of baseline values can be set and with different parameters, for example: baseline values set during initial motion tracking session(s) are convenient for determination of: overall change in stretching of the straps, adequateness in the positioning of the straps on the body member of the person, overall evolution in muscular mass of the person, etc.; baseline values set during the last N motion tracking sessions, with N being a natural number greater than 1, are convenient for determination of: the most recent evolution in muscular mass of the person, possible damage that the strap could be suffering on last sessions, possible adaptation of baseline values to person habits/routine when placing the straps (for instance, the person can have the routine of putting the straps on a particular way even if the resulting stretch or length values do not deviate too much from the baseline values), etc., and baseline values set at the beginning of an ongoing motion tracking session are convenient for adequateness in the positioning of the straps on the body member of the person as well.

If the comparison made, which is made for each strap of the plurality of straps, results in one or more difference values exceeding the predetermined threshold, the computing device determines that there is an irregular situation and executes a corrective action.

As the person skilled in the art will appreciate, the corrective action might be made dependent upon one or more factors, such as: the number of straps whose comparisons result in the excess of the predetermined threshold, how much the predetermined threshold is exceeded, how much time has elapsed from the last motion tracking session undertaken by the same person, etc.

In some embodiments, comparing the stretch or length values comprises: deriving the length value per each strap of the plurality of straps, and comparing the length value of each strap of the plurality of straps with the stored baseline value of the respective strap.

The computing device takes into account the stretch value to estimate the length of the strap as stretched, i.e. how long the strap is while stretched because it is arranged on the body member of the person. To avoid erroneous computations due to sporadic rearrangement of straps by the person, or due to the soft tissues or clothes, preferably a set of stretch values of a same strap are first processed to make an average thereof so as to compensate for any outlier value. The number of stretch values to average or during how much time are stretch values let in (i.e. duration of time window) to make the average can both be configured so as to provide a balance between readiness of use and accurate measurements. The length values are then derived using the stretch values or averaged stretch values.

The computing device preferably also takes into account a predetermined length of the strap for computing the length value. In this sense, the predetermined length may be a nominal length of the strap when manufactured, or it may alternatively be a length value introduced by the user, for example it is envisaged that, in an attempt to keep using worn off straps, the user measures the length of a strap when the strap is not arranged on a body member, and registers said length in the computing device as a predetermined length; in this manner, a same strap can be reused many times even if the accuracy of the length value derived by the computing device might be lower.

The calculation of the length values is based on a curve or equation that relates the length or change in length of the strap per unit of the magnitude measured by the stretching sensor, for example in millimeters per ohm or millimeters per milliampere, to name a few examples. The curve or equation depends upon the material of the strap and the stretching sensor used.

In some embodiments, the corrective action includes one or more of:
  determining the body member of the person on which each strap of the plurality of straps is arranged; providing or commanding provision of one or more user perceptible signals indicative of incorrect arrangement or wearing off of the strap corresponding to the difference exceeding the predetermined threshold; and
  transmitting, to an electronic device remote from the computing device, a notification of incorrect arrangement or wearing off of the strap corresponding to the difference exceeding the predetermined threshold.

Motion tracking systems based on inertial measurement units arrangeable on a person typically have one or more ways of establishing where each unit is on the body of the person. These ways may range from the person correctly attaching the units or straps throughout its body according to the instructions received from the motion tracking system to run a calibration procedure in which the person moves in a particular manner so that the computing device figures out the arrangement of the units.

Stretch or length values of straps can be used to derive a possible positioning of the straps on the person that can be used alternatively to or in addition to other existing techniques, for instance those described above. To this end, the computing device considers said values and the predetermined strap arrangement, which is data processed by the computing device to establish which body members are being tracked in one or more exercises. For the sake of the example only, if the predetermined strap arrangement indicates that two straps are to be used by the person, and one strap shall be arranged on the chest and the other strap shall be arranged on one upper arm, the difference in stretch or length values and the difference in perimeters of both the chest and upper arms results in the determination of where each strap is. The positioning that the computing device determines can be taken into account for the motion tracking sequence to be provided, so the measurements of a unit in or attached to a strap will be assigned to one body member or another.

If the computing device determines a possible misplacement of one or more straps, it may inform the person accordingly. The person can rearrange the one or more straps before starting the motion tracking session or while performing exercises in a motion tracking session. Regarding the latter, oftentimes the straps have their position changed due to the movements performed by the person.

The computing device can likewise or alternatively transmit the notification to the electronic device to inform a different person, for example a personal trainer or a therapist monitoring the activity of the person or the evolution of the person over time, or personnel in charge of maintenance of the motion tracking system. Any of the informed people can provide guidance to the person on how to arrange the straps, or schedule the repairment or the replacement of one, some or all straps.

In some embodiments, the stretch values are first stretch values and the length values are first length values; and the method further includes:

processing, by the computing device, one or more second stretch values per strap of the plurality of straps, each second stretch value being representative of stretching of the respective strap while arranged on the respective body member of the person, the respective body member being a predetermined body member of a predetermined strap arrangement; and
  computing, by the computing device, the baseline value for each strap of the plurality of straps by averaging the one or more second stretch values of the strap, if comparing stretch values, and/or by averaging one or more second length values derived from the one or more second stretch values, the second length values being representative of the length of the respective strap of the plurality of straps at least based on the respective second stretch value; and
  storing, by the computing device, the baseline value for each strap of the plurality of straps, thereby providing the stored baseline values; and
  storing the baseline values precedes processing the one or more first stretch values per strap.

For a more representative set of baseline values, because it shall be noted that there shall be a baseline value per strap, it is preferable to average derived stretch (or length) values of a number of motion tracking sessions, this way alterations in the baseline values owing to e.g. clothes, soft tissue, misplacement of the straps, etc. that may occur one day are partially compensated for.

In some embodiments, both storing the baseline values and comparing the first stretch or length values take place during the same motion tracking session.

The use of baseline values taken during the same motion tracking session aid in the supervision of the ongoing activity of the person. Movements of straps while the person exercises can be more precisely detected by the computing device because the baseline values are established with the person having the same condition as when exercising.

In some embodiments, comparing the first stretch or length values takes place during a first motion tracking session, and storing the baseline values takes place during a second motion tracking session; the second motion tracking session precedes the first motion tracking session.

The use of baseline values taken in a previous motion tracking session make possible to assess the evolution of the person resulting from the exercising performed since that previous motion tracking session in which the baseline values were stored. As aforementioned, the baseline values can be established as an average of stretch or length values computed in different motion tracking sessions, and that is possible in these embodiments as well.

In some embodiments, storing the baseline value for each strap of the plurality of straps includes:
  taking one or more images by an optical sensing device, the one or more images at least including a portion of the person including body members of the predetermined strap arrangement;
  processing, by the computing device, the one or more images to determine positions of the plurality of units while attached to the plurality of straps based on a light of a light emitter in each unit of the plurality of units;
  computing, by the computing device, a position where each strap of the plurality of straps is arranged on the person at least based on the determined positions resulting from the processing of the one or more images;
  computing, by the computing device, a difference between the computed position of each strap and a predetermined position for the corresponding strap as indicated in the predetermined strap arrangement; and storing the baseline value for each strap of the plurality of straps when none of the computed differences exceed a predetermined position difference threshold.

The storing of the baseline value may be conditional on whether the motion tracking system first determines that the straps are correctly positioned on the person. Deviations in position of straps results in stretch or length values that do not correctly represent the stretching or length of the strap when arranged in the intended body member.

The optical sensing device is adapted to take images and can be, for example, a digital camera, a mirrorless camera, etc. The optical sensing device is, in some embodiments, included in the computing device whereas, in some other embodiments, the optical sensing device is included in the motion tracking system but is external to the computing device.

The taking of images and, thus, the optical sensing device is particularly used in those embodiments in which each unit includes a light emitter. The images include the light of the light emitters while enabled, and with computer vision it can be established where on the body of the person the light of each light emitter is. For that, the computing device processes the images to detect the person, e.g. the contour thereof, the contour of the body members, etc. and then pinpoint the location of the lights thereon. As the units are arranged on the straps, the position of the straps is tied to the position of the units.

The predetermined strap arrangement preferably includes an indication of where each strap shall be relative to the body member itself, e.g. at a distance of 40% measured from the top/bottom of the body member (which is the top/bottom joint that it is connected to), at a distance of 50%, etc. A difference between this distance value and the one computed by the computing device, it can be established whether the strap is within an acceptable region on the body member or not, and if it is, then the stretch or length value resulting from the strap can be considered an accurate representation of the stretch or length of the strap arranged on the respective body member.

In some embodiments, the light of the light emitter in each unit of the plurality of units have a different color and/or intensity.

The use of different colors and/or intensities might ease the computer vision run by the computing device.

In some embodiments, the method further includes transmitting, by the computing device to at least one unit of the plurality of units, an instruction to change an operation of the light emitter of the unit to which the instruction is transmitted.

In some embodiments, the method further includes, after comparing the stretch or length values, determining, by the computing device, on which predetermined body member each strap is arranged at least based on the stretch or length values and a predetermined perimeter of each predetermined body member of the predetermined strap arrangement.

The predetermined strap arrangement together with predetermined perimeters of the body members where the different straps shall be arranged (or, alternatively, relationships between perimeters of the body members where the different straps shall be arranged) are a source of data that make the computing device capable of determining on which body member each strap is arranged.

The predetermined perimeters can be set by means of statistics, by actually measuring the perimeter of the body members of the person that is to use the motion tracking system, or by other estimative technique. It is envisaged that the predetermined perimeters are set statistically for the average person, and the values thereof be multiplied by one or more factors dependent upon the characteristics of the person using the motion tracking system, e.g. the build thereof, the height, etc.; the characteristics of the person can be assessed and introduced by the person itself during use of the motion tracking system, or be assessed by another person like e.g. a personal trainer or therapist. By way of example, a slim person can have a modifying factor f equal to 0.75 with respect to the average person, and an overweight person can have a modifying factor f equal to 1.3. Additionally, a set of modifying factors can be established for different body members of the person, for example the chest may have a first modifying factor $f_1$, the arms may have a second modifying factor $f_2$, and the legs may have a third modifying factor $f_3$; in this way, the variations in perimeter of the different body members are accounted for in light of the characteristics of the person.

By comparing the stretch or length values with the predetermined perimeters for the body members indicated in the predetermined strap arrangement, the computing device determines the position on the body of each strap. This is particularly convenient for quick and simple configurations of the motion tracking system whenever it is to be used because the user may do without any calibration of the straps or IMUs, or the person can disregard the selection of particular straps for arrangement thereof on particular body members. So the person simply grabs and puts the straps on the body members of the predetermined strap arrangement without paying much attention, and the computing device determines how they are arranged so that the motion tracking sequence provided afterwards is meaningful.

In some embodiments, the method further includes:

taking one or more images by an optical sensing device, the one or more images at least including a portion of the person including body members of the predetermined strap arrangement;

processing, by the computing device, the one or more images to determine positions of the plurality of units while attached to the plurality of straps at least based on a light of a light emitter in each unit of the plurality of units; and determining, by the computing device when the predetermined strap arrangement at least includes the two same body members having left and right body members, unevenness in the positions of two straps of the plurality of straps arranged on the two same body members at least based on the determined positions resulting from the processing of the one or more images.

In some embodiments, the execution of the corrective action takes place further when there is unevenness in the positions of the two straps.

By optically tracking the position of the units, the computing device determines whether straps are correctly arranged on the person according to the predetermined strap arrangement, especially when the stretch or length values appear not to properly correspond with predetermined perimeters. That can occur, for example, when there is unevenness in the positions of two straps (e.g. one is higher up than the other) or there are differences in muscular mass between two body members expected to have same or similar muscular mass. The execution of the corrective action can be dependent upon any of these determinations as well in order to improve the operation of the motion tracking system.

In some embodiments, determining on which predetermined body member each strap is arranged includes:
  providing or commanding provision of one or more user perceptible signals indicative of a predetermined movement to be performed by the person when the predetermined strap arrangement at least includes two same body members having left and right body members, and the predetermined movement involves moving one of the two same body members;
  receiving one or more stretch values per strap of the plurality of straps while the person is performing the predetermined movement; and
  processing the one or more stretch values per strap of the plurality of straps to determine variation in the one or more stretch values of at least one of the straps that corresponds with the predetermined movement; and
  the straps are determined to be in the at least two same body members at least based on the stretch or length values and the predetermined perimeter, and are determined to be in the left or right body members at least based on the processed one or more stretch values per strap.

In the context of the present disclosure, the term two same body members refers to a body member having left and right body members, e.g. shoulders, arms, ankles, etc.

The figuring out by the computing device of where each strap is on the body of the person becomes more complex when two same body members shall have a strap arranged thereon because, in principle, the perimeters of both shall be the same. Accordingly, in these cases, the computing device may at least instruct the person to perform one or more movements involving one of the two same body members, or two movements that require the separate movement of the two same body members, to determine on which of the two body members each strap is.

To make this determination, the computing device relies on the variation in the stretching of the straps during the performance of the movement. The motion (or no motion when the computing device instructs not to move one of the two same body members and, thus, shall remain static) of the body members is reflected in the stretch values, and the stretch values are correlated by the computing device with the movement or movements instructed to the person.

In some embodiments, the method further includes:
  determining, by the computing device, muscular mass imbalance between the two same body members by comparing the respective stretch or length values; and
  executing, by the computing device, a muscular mass imbalance corrective action upon determining that the muscular mass imbalance is greater than a predetermined muscular mass imbalance threshold, the muscular mass imbalance corrective action includes one or more of:
    storing and/or transmitting, to an electronic device remote from the computing device, the stretch or length values of the two same body members in each motion tracking session;
    transmitting, to an electronic device remote from the computing device, the stretch or length values of the two same body members and awaiting reception, to the computing device from the electronic device, of at least one of: a voice communication link, a video communication link, and a data communication link with one or more predetermined movements to be performed by the person; and
    setting one or more predetermined movements to be performed by the person such that at least one predetermined movement thereof has a constraint or set of constraints for one of the two same body members that is different than an analogous constraint or set of constraints for the other one of the two same body members.

Since the stretching of the straps depends upon the perimeter of the body members, the stretching can also be used to track the muscular mass of the body members. This, in turn, allows to check how the muscular mass of the body members evolves, and if two same body members have muscular mass differences. The difference in stretch or length values for straps arranged on two same body members thus could reveal muscular mass imbalance between the two body members. When such phenomenon is detected, the computing device executes one or more muscular mass imbalance corrective actions: to register the evolution is muscular mass imbalance over motion tracking sessions, to inform a personal trainer or therapist so that the person can be supervised more closely or be requested to change the movements or not perform them at all, and/or to change the intensity of the movement for one of the two body members by altering the constraints to be met.

The adjustment of the movements and, thus, of the exercises involves changing the difficulty thereof, and that is done with the purpose of evening the muscular mass. The adjustment avoids more injuries due to additional stress affecting adjacent joints, tendons and/or bones. The assessment of the evolution of the muscular mass during the exercising is preferred in cases where the person has this condition at some point during the rehabilitation process.

In some embodiments, the method further includes:
  providing or commanding provision, by the computing device, of one or more user perceptible signals indicative of one or more predetermined movements to be performed by the person during a motion tracking session;
  receiving, by the computing device, one or more measurements from each unit of the plurality of units while the respective unit is attached to a strap, the strap is arranged on the predetermined body member and the person is performing one of the one or more predetermined movements; and
  processing, by the computing device, the received one or more measurements to provide a motion tracking sequence of the person or body members thereof when:
    no corrective action is executed by the computing device; or
    the computing device executes a corrective action that includes determining the body member of the person on which each strap of the plurality of straps is arranged, the body member where each strap is arranged being indicated in the predetermined strap arrangement, and the motion tracking sequence provided is at least based on the determination made.

The exercising by the person and the motion tracking procedure that yields a motion tracking sequence of at least the tracked body members takes place after and/or during the assessment of the stretching of the straps by the computing device so that the resulting motion tracking sequence accurately reflects the movements made by the person.

This means that there may be an initial assessment, namely before the person starts exercising, whereby the computing device properly sets the motion tracking system, or requests the person to properly arrange the straps, or even informs personnel that should supervise the activity of the person.

In addition to the initial assessment, or irrespectively of whether the initial assessment takes place, the computing device checks the stretching of the straps every now and then (the frequency of the checks can be configured according to different criteria, including but not limited to, the characteristics and condition of the person) while the person exercises, namely while the person performs predetermined movements. In the event that the straps move out of place, the computing device can execute a corrective action to reduce worsening of the motion tracking sequence provided, for instance but without limitation, request the person to adjust the position of the straps, trigger a calibration procedure or digitally change the position of the straps so that the measurements of the units are considered to be for units at the changed position.

In some embodiments, the length of all straps of the plurality of straps is the same.

In some embodiments, the length of at least one strap of the plurality of straps is different from the length of at least one other strap of the plurality of straps.

The length mentioned here refers to the length of the straps as manufactured or nominal length, thus it does not refer to the length of the straps after being used and, possibly, worn off or deformed.

The motion tracking system can include equally-sized straps or differently-sized straps. The latter typically have a longer useful life because their sizes can be adapted to the body member they are to be usually arranged on, so longer straps can be arranged on e.g. the chest, hip, or thighs, whereas shorter straps can be arranged on other body members like upper and lower arms, ankles, etc. When the computing device takes into account the predetermined lengths of the straps, the predetermined lengths can be different for the several straps if they are not equally-sized.

The computing device can function with stretch values for both sets of straps, i.e. equally or not equally-sized, notwithstanding the result of the processing made is less accurate when straps are not equally-sized and the difference in length from one strap to another is greater. With both sets of straps the computing device can also function with length values rather than stretch values, but it is preferable to use length values at least when the straps are not equally-sized, and more preferable the greater the differences in length are.

In some embodiments, the method further includes sensing, by each stretching sensor, the stretch values.

In some embodiments, the method further includes arranging the plurality of straps on the body of the person according to the predetermined strap arrangement. Such arrangement refers to arranging one strap on one body member indicated in the predetermined strap arrangement so that all body members indicated in the predetermined strap arrangement have at least one strap arranged thereon.

In some embodiments, each strap of the plurality of straps has a unit of the plurality of units integrally formed thereon.

In some embodiments, each strap of the plurality of straps is adapted to receive a unit of the plurality of units in a detachable manner.

The straps can be repaired, replaced or recycled independent from the IMUs when they are separate from the IMUs, namely when the IMU is to attach to the strap and the strap is to receive the IMU. When the unit is integrally formed with the strap, when there is a problem with the strap or the unit, both must be repaired, replaced or recycled at the same time. The straps can break or get damaged more often than the units, especially for the wearing off of the straps during usage.

In some embodiments, the method further includes receiving, by the computing device from each strap of the plurality of straps, the stretch values.

In some embodiments, the method further includes receiving, by the computing device from each unit of the plurality of units, the stretch values of the strap that the unit is attached to. In this sense, each unit of the plurality of units first receives the stretch values from the respective strap, preferably in a wired manner, e.g. via an electrical connection, or in a wireless manner.

The straps might transmit the measurements to the computing device, either wirelessly or in wired form, for instance by connecting a cable or with electrical terminals like pogo pins between the two. Wired transmission is convenient when the person is not wearing the straps, like while the straps are stored or charging up in the cases where the straps are provided with a battery.

Notwithstanding, it may be preferable to make the straps transmit the measurements to the IMU that they connect to, and the IMUs rely the measurements to the computing device wirelessly. IMUs for motion tracking system usually include a wireless communications module, hence the straps can advantageously use the module of the respective units in this manner.

In some embodiments, the method further includes:
processing, by the computing device, at least an unaltered stretch value per strap of the plurality of straps, each unaltered stretch value being representative of stretching of the respective strap while not arranged on the person;
comparing, by the computing device, the unaltered stretch value of each strap of the plurality of straps or an unaltered length value derived therefrom with a stored baseline unaltered value of the respective strap, and the unaltered length value being representative of the length of the respective strap of the plurality of straps at least based on the respective unaltered stretch value; and
executing, by the computing device, a corrective action at least when one of the comparison made with respect to a baseline unaltered value exceeds a predetermined unaltered threshold.

The use of unaltered stretch values eases the identification of deformed or worn-off straps. In this sense, the unaltered stretch values are taken while the straps are not being stretched and, hence, are in a rest state so to speak, for example while the straps are lying on a table or are inside a case.

Unaltered stretch values are preferably measured prior to the start of the motion tracking sessions, namely before the person starts to arrange the straps thereon.

The straps might measure the stretch values at different points in time. Upon detecting a variation in stretch value exceeding a predetermined threshold, which indicates that the strap is being manipulated, the strap takes the previous or the current stretch value measured as the unaltered stretch value.

In embodiments in which unaltered length values are derived, they are derived from the unaltered stretch values so that effective comparison with further unaltered length values is possible.

The baseline unaltered value can be established, for example, the first time the straps are to be used by anyone (not just the person that is at that time user of the motion tracking system), as an average of the stretch or length values resulting from a number of first motion tracking sessions to allow the strap to initially adjust to its usage, or even during the production thereof.

In some embodiments, each strap of the plurality of straps is closed, i.e. it is a closed curve designed not to be opened. In some embodiments, each strap of the plurality of straps is open, i.e. open-ended, includes first and second ends, and is adapted to be closed to stay attached to a body member of the person; such straps preferably include means for staying closed, e.g. clasps, Velcro, etc.

A second aspect of the disclosure relates to a motion tracking system including:
- a plurality of straps;
- a plurality of inertial measurements units;
- a plurality of stretching sensors, each sensor at least attached to a strap of the plurality of straps; and
- a computing device configured to carry out a method according to the first aspect of the disclosure.

The motion tracking system is capable of digitally adjusting operation of the motion tracking system, and/or determine characteristics about the straps and/or a person using the motion tracking system by way of the stretching of the straps. In this sense, the computing device preferably includes at least one processor and at least one memory configured to carry out the method. At least one memory can store instructions or computer program code intended to cause the system to perform the steps of the method.

A third aspect of the disclosure relates to a data processing apparatus including at least one processor adapted to perform a method according to the first aspect of the disclosure.

A fourth aspect of the disclosure relates to a computer program product that has instructions which, when executed by a computing device, cause the computing device to perform a method according to the first aspect of the disclosure.

In some embodiments, the computer program product is embodied on a non-transitory computer-readable medium or a computer-readable data carrier has the computer program product stored thereon.

A fifth aspect of the disclosure relates to a data carrier signal carrying a computer program product according to the fourth aspect of the disclosure.

Similar advantages as those described for the first aspect of the disclosure are also applicable to the second, third, fourth, and fifth aspects of the disclosure.

BRIEF DESCRIPTION OF THE DRAWINGS

To complete the description and in order to provide for a better understanding of the disclosure, a set of drawings is provided. Said drawings form an integral part of the description and illustrate embodiments of the disclosure, which should not be interpreted as restricting the scope of the disclosure, but just as examples of how the disclosure can be carried out. The drawings comprise the following figures.

DETAILED DESCRIPTION OF THE DRAWINGS

Figure 1:
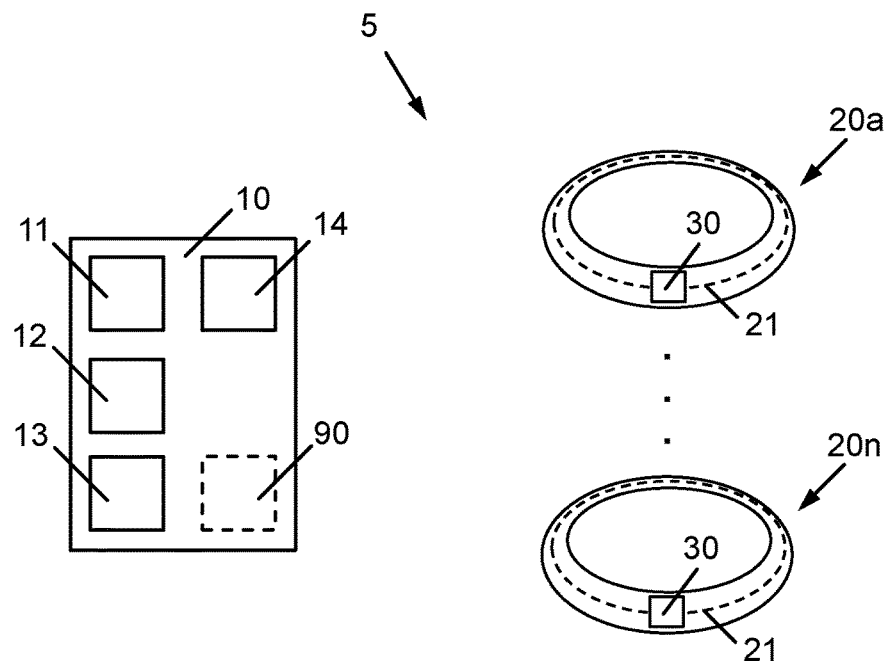
FIG. 1 diagrammatically shows a motion tracking system in accordance with embodiments.

FIG. 1 diagrammatically shows a motion tracking system 5 in accordance with embodiments. The motion tracking system 5 includes a computing device 10, which may be e.g. a tablet, a mobile phone, a personal computer, etc., one or more straps 20a-20n, and one or more stretching sensors 21 each associated with one strap 20a-20n. The straps 20a-20n are of stretchable material, e.g. elastane (polyurethane rubber), stretch cotton (cotton with elastane), neoprene rubber, or nylon with elastomer, etc. Each strap 20a-20n includes an inertial measurement unit 30 with inertial sensors, that is to say, a motion tracker, which will be described in more detail with reference to FIG. 2. And as will be described then, the IMU 30 of each strap 20a-20n preferably includes the same inertial sensors. Although not illustrated, the strap 20a-20n may likewise include a battery.

The IMU 30 of the strap 20a-20n can be detachable, hence the IMU 30 is selectively coupled with the strap 20a-20n whenever needed, or non-detachable, hence the strap 20a-20n has the IMU 30 built therein. Regarding the former, both the straps 20a-20n and the respective IMUs 30 are adapted for electrical connection one with the other by way of electrical interfaces or terminals included therein intended to cooperate.

Each strap 20a-20n is adapted to be arranged on the body of a person so that, while IMUs 30 are attached to the straps 20a-20n, the measurements provided by each tracker 30 will provide a motion tracking sequence of the person after the computing device 10 processes said measurements. The straps 20a-20n are associated with the IMUs 30 by way of the electrical connection that exists between the two so that the computing device 10 gets to know which IMU 30 is on which strap 20a-20n, thereby making possible to relate measurements of the IMUs 30 with the straps 20a-20n and the respective stretching sensors 21. Each IMU 30 and/or strap 20a-20n indicates its respective logical association to the computing device 10 by transmitting that data in one or more packets. Alternatively, the logical associations between straps 20a-20n and IMUs 30 can be inferred by the computing device 10 without requiring reception of said data. For example, by estimating the position of each strap 20a-20n and IMU 30 in accordance with the angle of arrival of their respective wireless transmissions and linking the straps 20a-20n to the IMU 30 closest thereto; the computing device includes a plurality of antennas at least in that case.

The straps 20a-20n may be open-ended, in which case they include some attaching device like, for instance, clasps, Velcro, etc., or be closed, in which case the person slips the body member into the strap 20a-20n.

The stretching sensors 21 can be embedded on the strap 20a-20n itself or both on the strap 20a-20n and the respective unit 30. The sensors 21 are represented with a dashed line extending along the respective strap 20a-20n just to illustrate, for the sake of clarity, that they measure the stretch of the entire strap relative to its length with e.g. a sensing band. Measurements of the stretching sensor 21 can be transmitted to the computing device 10 via the respective IMU 30, or via a wireless communications module (not illustrated) of the respective strap 20a-20n in those embodiments in which the strap 20a-20n includes said module. When the measurements are to be transmitted via the IMU 30, the stretching sensor 21 has an electrical connection with the IMU 30 that enables the transmission of the measurements thereto, and the IMU 30 then transmits the measurements to the computing device 10. The electrical connection can be established automatically whenever the IMU 30 is received in the strap 20a-20n by way of electrical terminals provided on both.

The computing device 10 includes at least one processor 11, at least one memory 12, and a wireless communications module 13 for transmitting radiofrequency signals to the IMUs 30 and receive radiofrequency signals therefrom. The wireless communications module 13 includes at least an antenna 14 whereby electromagnetic waves may be captured, and then processed by the at least one processor 11, and radiated as well.

Preferably, the motion tracking system 5 and/or the computing device 10 also includes at least one device 90 (shown with dashed lines to illustrate that it can be part of the computing device 10 or be separate from the computing device 10) for providing user perceptible signals like e.g. a screen or loudspeakers, to name a few examples. That is to say, the at least one device 90 includes visual output means (e.g. screen, LEDs), audio output means (e.g. loudspeakers), vibrating means (e.g. a vibrator), etc. for providing user perceptible signals in the form of sounds, vibration, animated graphics, etc. When the at least one device 90 includes a screen, the computing device 10 is capable of showing instructions and/or information to the intended user about the operation of the motion tracking system 5 and the motion tracking procedure to be conducted with the system 5, for example predetermined movements that are to be performed by an intended user of the motion tracking system 5, a predetermined strap arrangement, including but not limited to indications of a correspondence between straps 20a-20n and body members of the person for positioning them thereon, results of the assessment of the positions of the straps, etc. To this end, the computing device 10 stores, in the at least one memory 12, the predetermined strap arrangements, and also data relative to the physical exercises, i.e. predetermined movements, of intended users. Any of these data can be transmitted to and/or received from another electronic device thanks to the wireless communications module 13. For example, a therapist is able to receive the feedback at a computing device in a hospital so as to monitor the evolution of the person. Based on the feedback received, the therapist is able to adjust the difficulty of the movement(s), the number of repetitions thereof, prescribe new movements, etc. so that the person may further exercise using the motion tracking system 5.

Figure 2:
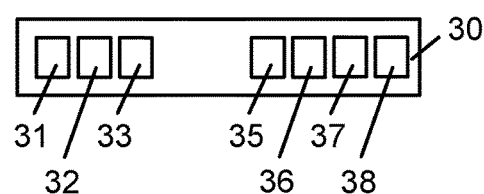
FIG. 2 diagrammatically shows an inertial measurement unit of motion tracking systems in accordance with embodiments.

FIG. 2 diagrammatically shows an inertial measurement unit 30 of motion tracking systems in accordance with embodiments.

The IMU 30 includes one or more inertial sensors selected from e.g. an accelerometer 31, a gyroscope 32 and a magnetometer 33. In the embodiment of FIG. 2, the tracker 30 includes all three inertial sensors 31-33, but in other embodiments the tracker only includes an accelerometer 31 and a gyroscope 32, for instance. As aforesaid, preferably but not necessarily, the IMUs of all straps of the motion tracking system have the same inertial sensors, this way all the measurements are based on the same type of sensing.

The IMU 30 further includes at least one processor 35, at least one memory 36, and a wireless communications module 37 for transmitting radiofrequency signals to and receiving radiofrequency signals from a computing device of the motion tracking system (e.g. the computing device 10 of FIG. 1). For example, the motion tracker transmits advertisement packages, data packets with identification data (e.g. one or more identities, keys, etc.), data packets with measurements of the inertial sensor(s) 31-33, etc., and receive packets from the computing device with e.g. instructions to start a calibration procedure for instance. When no wireless communications connections are established with the computing device, the radiofrequency signals of the IMU 30 includes advertisement packages for indicating its presence and that it is active. Once the wireless communications connections are established (using a technology and protocol known by a skilled person, for instance but without limitation, Bluetooth and Bluetooth Low Energy communications, cellular network communications such as GSM, UMTS or LTE, wireless LAN communications, etc.) with the computing device, the radiofrequency signals of the tracker may include identification data and/or the measurements, based on which the motion sequence will be provided by the computing device. An antenna 38 for radiating and capturing electromagnetic waves is provided as part of the wireless communications module 37.

Preferably, the at least one processor 35 of the tracker 30 runs a sensor fusion algorithm for processing the measurements of the inertial sensors 31-33 within the respective tracker. The sensor fusion algorithm is intended to enhance the raw measurements of the inertial sensors by correcting errors thereof due to drifts of the inertial sensors and, thus, outputs processed measurements that are to be transmitted to the computing device of the motion tracking system.

The IMU 30 may include part of the stretching sensor of a strap. In embodiments in which the IMU 30 is detachably attachable to the strap, the stretching sensor only provides stretch values while the IMU 30 is attached to the strap and, thus, both are electrically coupled.

The IMU 30 might also include one or more light emitters, e.g. LED(s). The computing device of a motion tracking system is capable of establishing where the IMU 30 is on the person upon detecting light of the light emitter(s), and/or said light can be used to guide the person in the arrangement of strap and/or IMU 30 on a body member thereof so that a predetermined strap arrangement is respected.

Figure 3A:
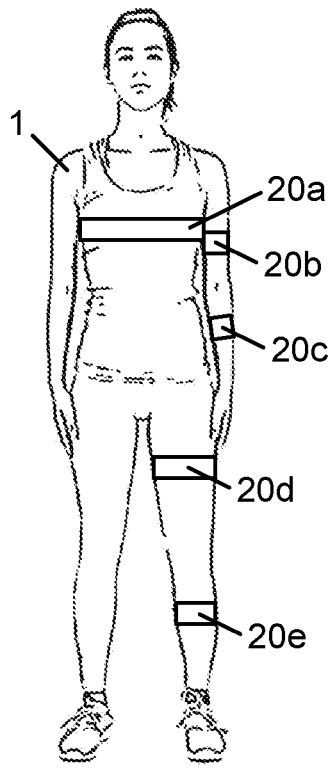
FIGS. 3A-3C show a person wearing straps with IMUs of a motion tracking system in different configurations.
Figure 3B:
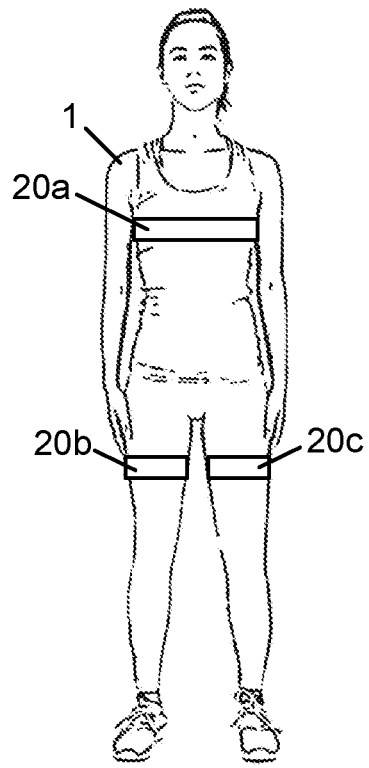
Figure 3C:
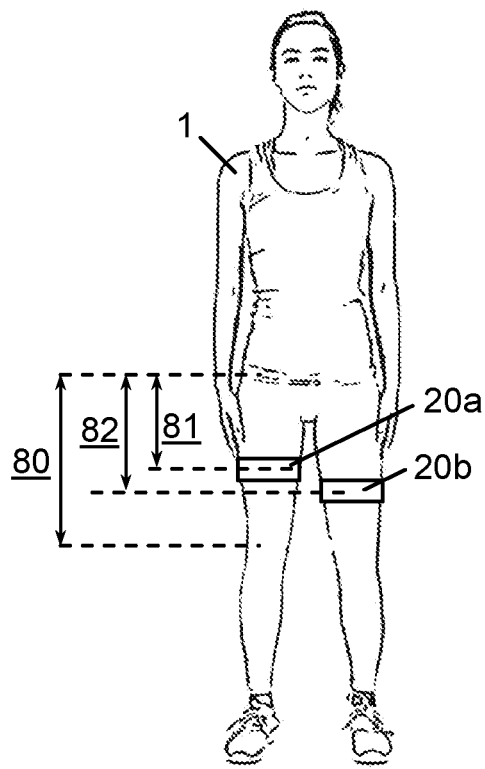

FIGS. 3A-3C show a person 1 wearing straps 20a-20e with IMUs of a motion tracking system in different configurations.

FIG. 3A shows the person 1 with a first strap 20a on a chest, a second strap 20b on the person's left upper arm, a third strap 20c on the person's left lower arm, a fourth strap 20d on the person's left thigh, and a fifth strap 20e on the person's left shin. The predetermined strap arrangement in this example is: the chest, the thigh, the shin, the upper arm and the lower arm, all the last four from the same side of the person. In this example, the straps 20a-20e feature different lengths, i.e. they have been manufactured differently-sized.

The predetermined lengths of the straps 20a-20e, i.e. nominal lengths, the stretch values provided by the straps 20a-20e, the length values derived by a computing device, and the stored baseline values for two different users are as follows.

| Strap | First 20a | Second 20b | Third 20c | Fourth 20d | Fifth 20e |
|---|---|---|---|---|---|
| Nominal length | 75 cm | 25 cm | 15 cm | 50 cm | 35 cm |
| Stretch value | 56 Ω | 60 Ω | 62 Ω | 57.5 Ω | 59 Ω |
| Length value | 81.1 cm | 30.3 cm | 18.5 cm | 53.5 cm | 36.2 cm |
| Baseline value for User A | 80 cm | 30 cm | 18 cm | 55 cm | 36.5 cm |
| Baseline value for User B | 76 cm | 28 cm | 18 cm | 53.5 cm | 35.5 cm |

From the comparison made by the computing device between length values and baseline values, and knowing that the person 1 in this case is User A, the computing device regards the arrangement of straps to be correct according to the predetermined strap arrangement and, thus, does not take any corrective action.

Further, the computing device is capable of determining where each strap is arranged considering predetermined circumferences of the body members indicated in the predetermined strap arrangement. For the sake of the example, the predetermined circumferences for the chest, thigh, shin, upper arm, and lower arm are, respectively, 75 cm, 55 cm, 26 cm, 22 cm, and 15 cm. Despite the differences between the length values derived and the predetermined circumferences, there is a correspondence between the variation in circumferences of the different body members and the variation in derived length values, and so the computing device determines that the first strap 20a is on the chest, the fourth strap 20d is on the thigh, the fifth strap 20e is on the shin, the second strap 20b is on the upper arm, and the third strap 20c is on the lower arm.

FIG. 3B shows the person 1 with a first strap 20a on a chest, a second strap 20b on the person's right thigh, and third strap 20c on the person's left thigh. The predetermined strap arrangement in this example is: the chest, and the two thighs. In this example, all the straps 20a-20c are equally-sized.

The stretch values provided by the straps 20a-20c and the baseline values for two different users are as follows.

| Strap | First 20a | Second 20b | Third 20c |
|---|---|---|---|
| Stretch value | 92.0 Ω | 57.7 Ω | 57.5 Ω |
| Baseline value for User A | 90.6 Ω | 57.5 Ω | 57.4 Ω |
| Baseline value for User B | 87.1 Ω | 55.1 Ω | 55.6 Ω |

The person 1 is once again User A. In this example, no length values were computed and/or used by the computing device, but in other examples they are computed and/or used even if the straps 20a-20c are equally-sized.

The computing device considers that the differences between the stretch values and baseline values are not excessive and, thus, no corrective action is taken. Further, the computing device is capable of determining that the first strap 20a is on the chest and the second and third straps 20b, 20c are on the thighs owing to the predetermined circumferences that these body members typically have, especially with respect to the predetermined circumference that a chest typically has, but is not capable of determining on which of the left and right thighs each of the second and third straps 20b, 20c is.

To resolve the ambiguity, the computing device instructs the user to move a specific one of the two legs and keep the other one substantially motionless. As the person 1 moves the leg, the respective strap 20b, 20c will stretch more or less, and thus by processing the stretch values provided during the movement of the person, the computing device will infer which strap is on the moving leg and which strap is on the non-moving leg. Confidence in the disambiguation can be increased by following this same procedure twice, one for each leg, so the two legs would be moved one after the other while keeping the other leg motionless.

With the position of the straps 20b, 20c known, as the stretch values are representative of the muscular mass of the concerned body members, both the stretch values can be used to identify and keep track of possible muscular mass imbalance between the two thighs (and other body members in other embodiments).

A difference between stretch values of the two straps 20b, 20c thus reveals how different the muscular mass is in the two thighs. The computing device preferably stores this difference at least every time the user starts a motion tracking session to be able to keep track of the evolution because it is important to know whether the user is closing the gap in muscular mass difference; the computing device additionally or alternatively preferably stores a baseline muscular mass imbalance value representing the difference in muscular mass, particularly in the first motion tracking session or several motion tracking sessions. When the imbalance exceeds a predetermined muscular mass imbalance threshold, execution of a muscular mass imbalance corrective action is preferred to avoid possible injuries of the person 1, for instance change the difficulty of the exercising for one thigh than for the other, halting the motion tracking session entirely so that the person 1 stops exercising altogether, etc.

FIG. 3C shows the person 1 with a first strap 20a on the person's right thigh and a second strap 20b on the person's left thigh. The predetermined strap arrangement in this example is: the two thighs.

The person 1 has arranged the first and second straps 20a, 20b on the two thighs positioned uneven, namely one of the straps 20a is higher up in the thigh than the other strap 20b, which means that the first strap 20a is closer to the hip joint than the second strap 20b while the person 1 is standing still and upright.

This situation is considered an incorrect placement of straps because even if it fulfills the indications of the predetermined strap arrangement, it does not result in a positioning of straps 20a, 20b that will produce an accurate motion tracking sequence upon processing measurements of the IMUs on the straps 20a, 20b. For an accurate motion tracking sequence, the two straps 20a, 20b shall be similarly positioned. The person 1, however, may inadvertently not detect this difference in position.

On which of the two thighs the first and the second straps 20a, 20b can be determined, for example, by way of the procedure described with reference to FIG. 3B.

Further, in some embodiments, the predetermined strap arrangement also includes positioning information, such as in this example, e.g.:

| Strap | First 20a | Second 20b |
|---|---|---|
| Body member | (left/right) Thigh | (right/left) Thigh |
| Position from top-most joint | 65% of thigh's length | 65% of thigh's length |

The position of the straps on the thighs is, in this case, defined in the predetermined strap arrangement referred to the position from the top-most joint and is calculated relative to the length 80 of the thigh itself; other definitions are likewise possible.

The first strap 20a is at a length 81 of approximately 54% of the thigh's length measured from the hip; the second strap 20b is at a length 82 of approximately 67% of the thigh's length measured from the hip.

The determination of such position of the straps 20a, 20b is possible, in some examples of the disclosure, by way of light emitters on the IMUs (not illustrated) on the straps 20a, 20b and an optical sensing device included in the computing device or the motion tracking system.

By lighting up the two lights and taking pictures of the IMUs and at least the thighs of the person 1, the computing device identifies the uneven positioning of the two IMUs and, thus, of the two straps 20a, 20b upon processing the pictures taken.

As a result, the computing device preferably executes a corrective action such as informing the person 1 of the uneven positioning of the two straps 20a, 20b. The computing device preferably repeats the procedure described to check whether the straps 20a, 20b have been correctly positioned by the person 1 after informing her/him about that problem.

In the embodiments where the computing device determines the perimeters of the body members, the device preferably waits for the position of the two straps 20a, 20b to be even (with a tolerable margin set with a predetermined position threshold like e.g. 5%, 10%, etc.) before determining the perimeters of the body members at least based on the stretch or length values of the straps 20a, 20b.

Figure 4:
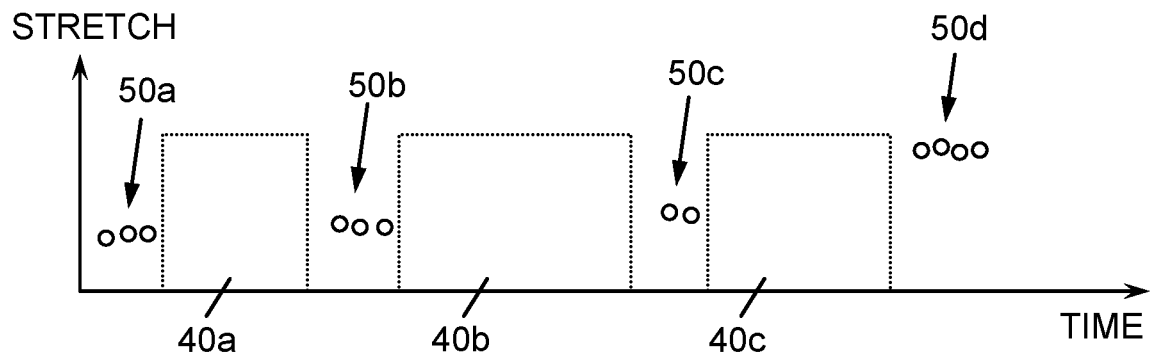
FIGS. 4-7 show graphs with exemplary representations of stretch or length values resulting from stretching sensors of motion tracking systems in accordance with embodiments while used by the same person.

FIG. 4 shows a graph of stretch values as provided overtime by one stretching sensor of a motion tracking system while the system is used by the same person. Like with FIGS. 5 and 6, it will be noted that a plurality of graphs could be provided, one per each stretching sensor of the system. Motion tracking sessions 40a-40c have been illustrated with dotted boxes for the sake of illustration only. Sets of stretch values 50a-50c (each represented with a circle) have been measured prior to each motion tracking session 40a-40c and some stretch values 50d also have been measured after the third motion tracking session 40c. The measurement of the stretch values outside of the motion tracking sessions 40a-40c means that the values are provided while the strap is not worn by any person; hence, the stretch values 50a-50d are also referred to as unaltered stretch values 50a-50d in the present disclosure. The unaltered stretch values 50a-50d are measured by stretching sensors prior to the computing device instructing the person to arrange the straps on the body, while inactive for some time, while charging up (in wired form, or wirelessly with e.g. magnetic charging), while connected to the computing device or a charging device in wired form, etc.

A baseline value for the respective strap can be set from one stretch value or, preferably, an average of a plurality of values of the sets of stretch values 50a-50c, for example from the initial set of stretch values 50a prior to the first motion tracking session 40a of a first person to use the motion tracking system. Said baseline value is also referred to as unaltered baseline value in the present disclosure.

As the strap is used in motion tracking sessions 40a-40c, it degrades over time and it stretches more and more even while not being worn by a person. After the third motion tracking session 40c, the stretch values 50d measured are greater than a baseline value set with, as aforesaid for the sake of this example, with an average of the first set of stretch values 50a. If the difference between one stretch value or, preferably, an average of the stretch values of the last set 50d and the baseline value exceeds a predetermined threshold, a computing device of the system executes a corrective action.

Figure 5:
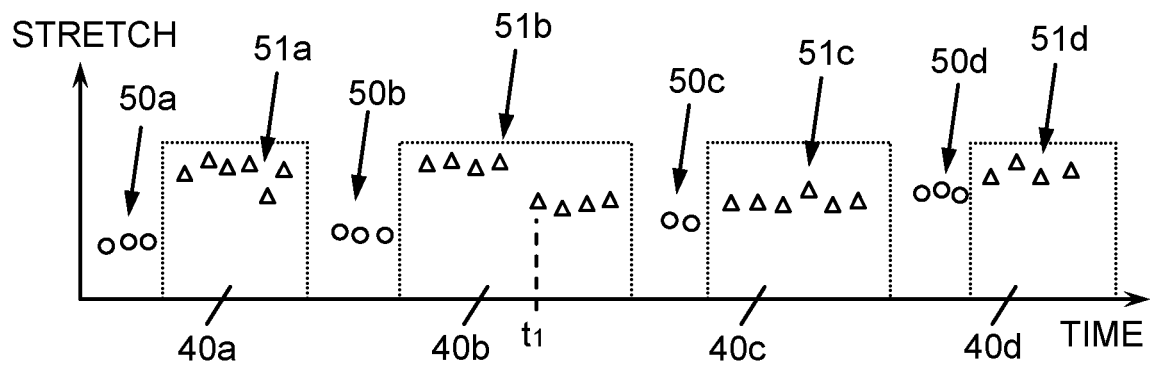

FIG. 5 shows a graph of stretch values 50a-50d, 51a-51d as provided over time by one stretching sensor of a motion tracking system. For the sake of clarity only, sets of stretch values 51a-51d provided within motion tracking sessions 40a-40d are represented with triangles. Unlike the unaltered stretch values 50a-50d, the stretch values 51a-51d are provided while the respective strap is arranged on a body member of the person. It is not necessary that the strap is always arranged to the same body member between different motion tracking sessions 40a-40d, or even within a same motion tracking session 40a-40d, like when the person is to perform two different exercises having different predetermined strap arrangements associated therewith.

In contrast to the example of FIG. 4, the sets of unaltered stretch values 50a-50d do not trigger the execution of any corrective action because an unaltered baseline value is not exceeded beyond a predetermined threshold. Further, additional baseline values may be set during usage of the motion tracking system.

By way of example, a baseline value related to each particular motion tracking session 40a-40d is set after arranging the strap on the body member during the session 40a-40d, such as at the beginning of the session 40a-40d. In this sense, every time a new predetermined strap arrangement is used during a motion tracking session, a new baseline value can be set. These baseline values are indicative of changes in the arrangement of the strap during the motion tracking session itself, like when one strap moves along the respective body member.

By way of another example, a baseline value is set by averaging stretch values 51a, 51b provided during a first motion tracking session 40a, or during the first and a second motion tracking sessions 40a, 40b, which are undertaken by the same person. It is to be noted that first baseline value can be set by averaging stretch values of one or several motion tracking sessions 40a-40d while the strap is arranged on the same body member. During the second motion tracking session 40b there are two distinct predetermined strap arrangements whereby the strap is moved to another body member for the performance of one or more exercises after time $t_1$. These baseline values enable the monitoring of the evolution of the person with each new motion tracking session 40a-40d.

Figure 6:
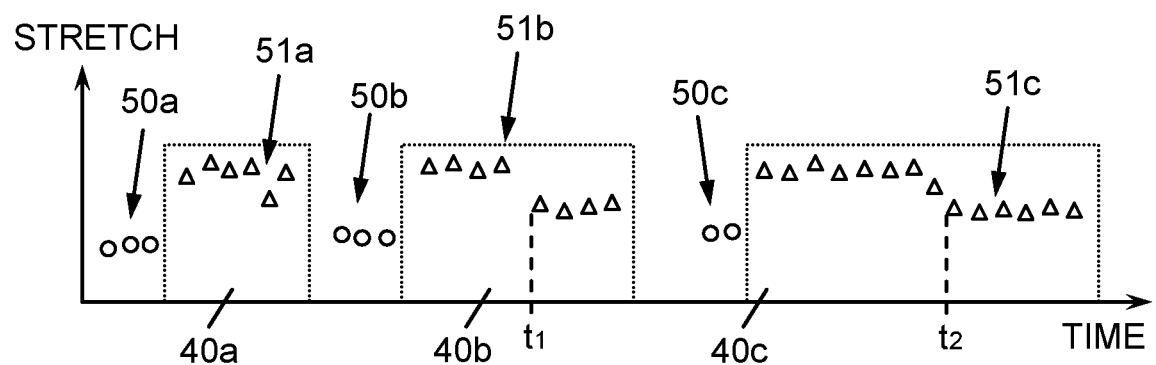

FIG. 6 shows a graph of stretch values 50a-50c, 51a-51c as provided over time by one stretching sensor of a motion tracking system.

Like in the example of FIG. 5, in the second session 40b no corrective action is executed because the stretch values 51b (or length values if computed) differ from a respective baseline value less than a predetermined threshold. The same holds true for the stretch values 51b (or length values if computed) after time equals $t_1$, which indicate a smaller stretch than that prior to time equals $t_1$ but because two different predetermined strap arrangements are considered by a computing device of the motion tracking system.

By contrast, in the third session 40c a corrective action is taken after time equals $t_2$; even if the behavior of the stretch values 51c is similar to that of the stretch values 51b of the second session 40b, no change in the positioning of the strap is instructed to the user, be it because the same predetermined strap arrangement from the beginning of the session 40c is still being used or a second predetermined strap arrangement within the session 40c does not require to move the strap that provides the stretch values 51c represented. This means that the strap is measuring considerably different (according to a predetermined threshold) stretch values 51c after time equals t2, which is indicative of movement of the strap somewhere on the body of the person wearing the strap, or possible damage in the strap or stretching sensor. The determination of a problematic operation and execution of corrective action within the third motion tracking session 40c will be described in more detail with reference to the example of FIG. 7 but with length values instead of stretch values; it is noted that the same procedure is followed by the computing device in both examples aside from computing the length values.

Figure 7:
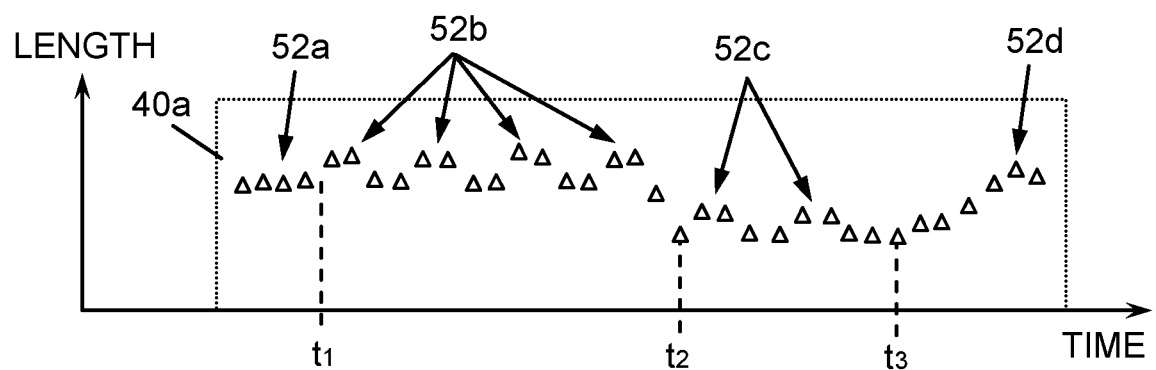

FIG. 7 shows a graph of length values 52a-52d (shown with triangles for the sake of clarity only) of a strap of a motion tracking system resulting from the stretch values of a stretching sensor associated with said strap. In this example, only values during a motion tracking session 40a are illustrated, but stretch and, optionally, length values can also be provided prior to and after the motion tracking session 40a.

A baseline value in the form of a baseline length value may already be stored for comparison by a computing device, and/or a baseline value can be set during the motion tracking session 40a. The latter will be described in the form of an example now.

At the beginning of the session 40a, a first set of length values 52a is used to define a baseline value, preferably by averaging a number of length values 52a. The person starts, at time equal $t_1$, to perform a predetermined movement several times thereby causing the stretching of the strap at each repetition as it can be appreciated from the computed length values 52b. The length values 52b during the exercising or, preferably, an average of the most recent length values 52b provided is compared to the baseline value. The most recent length values 52b can encompass the last N values (with N being a natural number equal to or greater than one), or the last values fitting inside a time window of a predetermined time duration T. If a difference between the two exceeds a predetermined threshold, a corrective action is to be executed.

In this case, no corrective action is executed up until time equal $t_3$. From time equal $t_2$, the length values reduced considerably with respect to the baseline value, potentially indicating that the strap moved along the body member and the stretching of the strap became smaller, but it is not until time equal $t_3$ when the average of the last N length values has resulted in a difference with respect to the baseline value that exceeds the predetermined threshold. In fact, the person was still performing the movements despite the movement of the strap based on the repeated increased length values 52c. The corrective action in this example resulted in the notification to the person that the strap moved, and the person afterwards repositioned the strap, resulting in length values 52d closer to the baseline value, at which point the exercising could be resumed.

Although in the present disclosure several examples have been described with reference to e.g. thighs, shins, upper arms, lower arms, etc., it will be noted that other body members are also within the scope of the disclosure since the aspects described are likewise applicable to other body members.

In this text, the term "includes", "comprises" and its derivations (such as "including", "comprising", etc.) should not be understood in an excluding sense, that is, these terms should not be interpreted as excluding the possibility that what is described and defined may include further elements, steps, etc.

On the other hand, the disclosure is obviously not limited to the specific embodiment(s) described herein, but also encompasses any variations that may be considered by any person skilled in the art (for example, as regards the choice of materials, dimensions, components, configuration, etc.), within the general scope of the disclosure as defined in the claims.

The invention claimed is:

1. A method comprising:
   processing, by a computing device, at least a stretch value per strap of a plurality of straps of a motion tracking system, each stretch value being representative of stretching of the respective strap while arranged on a respective body member of a person, the respective body member being a predetermined body member of a predetermined strap arrangement;
   deriving, by the computing device, at least a length value per each strap of the plurality of straps, the length value being representative of a length of a respective strap of the plurality of straps at least based on the respective stretch value;
   comparing, by the computing device, the length value of each strap of the plurality of straps with a stored baseline value of the respective strap, the stored value being associated with the same person; and
   executing, by the computing device, a corrective action at least when one of the comparisons made exceeds a predetermined threshold.

2. The method of claim 1, wherein the corrective action comprises one or more of:
   determining the body member of the person on which each strap of the plurality of straps is arranged;
   providing or commanding provision of one or more user perceptible signals indicative of incorrect arrangement or wearing off of the strap corresponding to the difference exceeding the predetermined threshold; and
   transmitting, to an electronic device remote from the computing device, a notification of incorrect arrangement or wearing off of the strap corresponding to the difference exceeding the predetermined threshold.

3. The method of claim 1, wherein the stretch values are first stretch values and the length values are first length values; wherein the method further comprises:
   processing, by the computing device, one or more second stretch values per strap of the plurality of straps, each second stretch value being representative of stretching of the respective strap while arranged on the respective body member of the person, the respective body member being the predetermined body member of the predetermined strap arrangement;
   deriving, by the computing device, one or more second length values per each strap of the plurality of straps, the second length values being representative of the length of the respective strap of the plurality of straps at least based on the respective second stretch value;
   computing, by the computing device, the baseline value for each strap of the plurality of straps by averaging the one or more second length values of the respective strap of the plurality of straps; and
   storing, by the computing device, the baseline value for each strap of the plurality of straps, thereby providing the stored baseline values;
   wherein storing the baseline values precedes processing the one or more first stretch values per strap.

4. The method of claim 3, wherein both storing the baseline values and comparing the first length values take place during a same motion tracking session.

5. The method of claim 3, wherein comparing the first length values takes place during a first motion tracking session, and storing the baseline values takes place during a second motion tracking session; wherein the second motion tracking session precedes the first motion tracking session.

6. The method of claim 3, wherein storing the baseline value for each strap of the plurality of straps comprises:
   taking one or more images by an optical sensing device, the one or more images at least including a portion of the person including body members of the predetermined strap arrangement;

processing, by the computing device, the one or more images to determine positions of a plurality of units while attached to the plurality of straps at least based on a light of a light emitter in each unit of the plurality of units;

computing, by the computing device, a position where each strap of the plurality of straps is arranged on the person at least based on the determined positions resulting from the processing of the one or more images;

computing, by the computing device, a difference between the computed position of each strap and a predetermined position for the corresponding strap as indicated in the predetermined strap arrangement; and storing the baseline value for each strap of the plurality of straps when none of the computed differences exceed a predetermined position difference threshold.

7. The method of claim 1, further comprising, after comparing the length values, determining, by the computing device, on which predetermined body member each strap is arranged at least based on the length values and a predetermined perimeter of each predetermined body member of the predetermined strap arrangement.

8. The method of claim 7, further comprising:

taking one or more images by an optical sensing device, the one or more images at least including a portion of the person including body members of the predetermined strap arrangement;

processing, by the computing device, the one or more images to determine positions of a plurality of units while attached to the plurality of straps at least based on a light of a light emitter in each unit of the plurality of units; and determining, by the computing device when the predetermined strap arrangement at least includes the two same body members having left and right body members, unevenness in the positions of two straps of the plurality of straps arranged on the two same body members at least based on the determined positions resulting from the processing of the one or more images.

9. The method of claim 7, wherein determining on which predetermined body member each strap is arranged comprises:

providing or commanding provision of one or more user perceptible signals indicative of a predetermined movement to be performed by the person when the predetermined strap arrangement at least includes two same body members having left and right body members, wherein the predetermined movement involves moving one of the two same body members;

receiving one or more stretch values per strap of the plurality of straps while the person is performing the predetermined movement; and processing the one or more stretch values per strap of the plurality of straps to determine variation in the one or more stretch values of at least one of the straps that corresponds with the predetermined movement;

wherein the straps are determined to be in the at least two same body members at least based on the stretch or length values and the predetermined perimeter, and are determined to be in the left or right body members at least based on the processed one or more stretch values per strap.

10. The method of claim 9, further comprising:

determining, by the computing device, muscular mass imbalance between the two same body members by comparing the respective stretch or length values;

executing, by the computing device, a muscular mass imbalance corrective action upon determining that the muscular mass imbalance is greater than a predetermined muscular mass imbalance threshold, the muscular mass imbalance corrective action comprises one or more of:

at least one of storing, by the computing device, and transmitting, to an electronic device remote from the computing device, the stretch or length values of the two same body members in each motion tracking session;

transmitting, to an electronic device remote from the computing device, the stretch or length values of the two same body members and awaiting reception, to the computing device from the electronic device, of at least one of:

a voice communication link, a video communication link, and a data communication link with one or more predetermined movements to be performed by the person; and setting one or more predetermined movements to be performed by the person such that at least one predetermined movement thereof has a constraint or set of constraints for one of the two same body members that is different than an analogous constraint or set of constraints for the other one of the two same body members.

11. The method of claim 1, further comprising:

providing or commanding provision, by the computing device, of one or more user perceptible signals indicative of one or more predetermined movements to be performed by the person during a motion tracking session;

receiving, by the computing device, one or more measurements from each unit of a plurality of units while the respective unit is attached to a strap, the strap is arranged on the predetermined body member and the person is performing one of the one or more predetermined movements; and processing, by the computing device, the received one or more measurements to provide a motion tracking sequence of the person or body members thereof when:

no corrective action is executed by the computing device; or the computing device executes a corrective action that comprises determining the body member of the person on which each strap of the plurality of straps is arranged, the body member where each strap is arranged being indicated in the predetermined strap arrangement, and the motion tracking sequence provided is at least based on the determination made.

12. A motion tracking system comprising:

a plurality of straps;

a plurality of inertial measurements units;

a plurality of stretching sensors, each sensor at least attached to a strap of the plurality of straps; and a device comprising at least one processor, and at least one memory storing computer program code, the at least one memory and the computer program code being configured, together with the at least one processor, to cause the device to at least perform:

process at least a stretch value per strap of the plurality of straps, each stretch value being representative of stretching of the respective strap while arranged on a respective body member of a person, the respective body member being a predetermined body member of a predetermined strap arrangement;

derive at least a length value per each strap of the plurality of straps, the length value being representative of a length of a respective strap of the plurality of straps at least based on the respective stretch value;

compare the length value of each strap of the plurality of straps with a stored baseline value of the respective strap, the stored value being associated with the same person; and execute a corrective action at least when one of the comparisons made exceeds a predetermined threshold.

13. The motion tracking system of claim 12, wherein the corrective action comprises one or more of:

determine the body member of the person on which each strap of the plurality of straps is arranged;

provide or command provision of one or more user perceptible signals indicative of incorrect arrangement or wearing off of the strap corresponding to the difference exceeding the predetermined threshold; and transmit a notification of incorrect arrangement or wearing off of the strap corresponding to the difference exceeding the predetermined threshold.

14. The motion tracking system of claim 12, wherein the stretch values are first stretch values and the length values are first length values; the at least one memory and the computer program code being configured, together with the at least one processor, to cause the device to at least perform:

process one or more second stretch values per strap of the plurality of straps, each second stretch value being representative of stretching of the respective strap while arranged on the respective body member of the person, the respective body member being a predetermined body member of the predetermined strap arrangement;

derive one or more second length values per each strap of the plurality of straps, the second length values being representative of the length of the respective strap of the plurality of straps at least based on the respective second stretch value;

compute the baseline value for each strap of the plurality of straps by averaging the one or more second length values of the respective strap of the plurality of straps; and store the baseline value for each strap of the plurality of straps, thereby providing the stored baseline values;

wherein the storage of the baseline values precedes processing the one or more first stretch values per strap.

15. The motion tracking system of claim 14, further comprising an optical sensing device; wherein storage of the baseline value for each strap of the plurality of straps comprises:

taking one or more images with the optical sensing device, the one or more images at least including a portion of the person including body members of the predetermined strap arrangement;

processing the one or more images to determine positions of the plurality of units while attached to the plurality of straps at least based on a light of a light emitter in each unit of the plurality of units;

computing a position where each strap of the plurality of straps is arranged on the person at least based on the determined positions resulting from the processing of the one or more images;

computing a difference between the computed position of each strap and a predetermined position for the corresponding strap as indicated in the predetermined strap arrangement; and storing the baseline value for each strap of the plurality of straps when none of the computed differences exceed a predetermined position difference threshold.

16. The motion tracking system of claim 12, wherein the at least one memory and the computer program code being configured, together with the at least one processor, to cause the device to at least perform: after comparing the length values, determine on which predetermined body member each strap is arranged at least based on the length values and a predetermined perimeter of each predetermined body member of the predetermined strap arrangement.

17. The motion tracking system of claim 16, further comprising an optical sensing device; the at least one memory and the computer program code being configured, together with the at least one processor, to cause the device to at least perform:

take one or more images with the optical sensing device, the one or more images at least including a portion of the person including body members of the predetermined strap arrangement;

process the one or more images to determine positions of the plurality of units while attached to the plurality of straps at least based on a light of a light emitter in each unit of the plurality of units; and determine, when the predetermined strap arrangement at least includes the two same body members having left and right body members, unevenness in the positions of two straps of the plurality of straps arranged on the two same body members at least based on the determined positions resulting from the processing of the one or more images.

18. The motion tracking system of claim 17, wherein the determination of on which predetermined body member each strap is arranged comprises:

providing or commanding provision of one or more user perceptible signals indicative of a predetermined movement to be performed by the person when the predetermined strap arrangement at least includes two same body members having left and right body members, wherein the predetermined movement involves moving one of the two same body members;

receiving one or more stretch values per strap of the plurality of straps while the person is performing the predetermined movement; and processing the one or more stretch values per strap of the plurality of straps to determine variation in the one or more stretch values of at least one of the straps that corresponds with the predetermined movement;

wherein the straps are determined to be in the at least two same body members at least based on the stretch or length values and the predetermined perimeter, and are determined to be in the left or right body members at least based on the processed one or more stretch values per strap.

19. The motion tracking system of claim 18, wherein the at least one memory and the computer program code is configured, together with the at least one processor, to cause the device to at least perform:

determine muscular mass imbalance between the two same body members by comparing the respective stretch or length values;

execute a muscular mass imbalance corrective action upon determining that the muscular mass imbalance is greater than a predetermined muscular mass imbalance threshold, the muscular mass imbalance corrective action comprises one or more of:

at least one of storing and transmitting the stretch or length values of the two same body members in each motion tracking session;

transmitting the stretch or length values of the two same body members and awaiting reception of at least one of: a voice communication link, a video communication link, and a data communication link with one or more predetermined movements to be performed by the person; and setting one or more predetermined movements to be performed by the person such that at least one predetermined movement thereof has a constraint or set of constraints for one of the two same body members that is different than an analogous constraint or set of constraints for the other one of the two same body members.

20. A non-transitory computer-readable storage medium comprising instructions which, when executed by a device, cause the device to at least carry out:

processing at least a stretch value per strap of a plurality of straps of a motion tracking system, each stretch value being representative of stretching of the respective strap while arranged on a respective body member of a person, the respective body member being a predetermined body member of a predetermined strap arrangement;

deriving at least a length value per each strap of the plurality of straps, the length value being representative of a length of a respective strap of the plurality of straps at least based on the respective stretch value;

comparing the length value of each strap of the plurality of straps with a stored baseline value of the respective strap, the stored value being associated with the same person; and executing a corrective action at least when one of the comparisons made exceeds a predetermined threshold.

* * * * *